United States Patent [19]

Green

[11] Patent Number: 4,838,922

[45] Date of Patent: Jun. 13, 1989

[54] METHOD FOR PRODUCING MONOCALCIUM PHOSPHATE AND PRODUCTS PRODUCED THEREFROM

[75] Inventor: Billy J. Green, Mena, Ark.

[73] Assignee: Green, Inc., De Queen, Ark.

[21] Appl. No.: 148,941

[22] Filed: Jan. 27, 1988

Related U.S. Application Data

[63] Continuation-in-part of Ser. No. 70,302, Jul. 6, 1987, abandoned.

[51] Int. Cl.$^4$ ............................................. C05B 11/10
[52] U.S. Cl. .......................................... 71/34; 71/41; 423/132; 423/158; 423/305
[58] Field of Search ...................... 423/132, 158, 305; 71/34, 41

[56] References Cited

FOREIGN PATENT DOCUMENTS 1592104  5/1972  Fed. Rep. of Germany ...... 423/132
1474056  5/1977  United Kingdom ................ 423/132

*Primary Examiner*—Ferris H. Lander
*Attorney, Agent, or Firm*—Hill, Van Santen, Steadman & Simpson

[57] ABSTRACT

Methods of producing monocalcium phosphate and products created therefrom are provided. The method includes the steps of mixing phosphoric acid and water with brown mud. Preferably, the phosphoric acid is added to water so that it comprises approximately 3% to about 50% of the phosphoric acid/water mixture by weight, and the water comprises approximately 50% to about 97% of the phosphoric acid/water mixture by weight. The brown mud is added to the phosphoric acid/water mixture in a weight ratio of approximately 1:1 to about 1:3. The method of the present invention results in improved monocalcium phosphate products.

20 Claims, No Drawings

METHOD FOR PRODUCING MONOCALCIUM PHOSPHATE AND PRODUCTS PRODUCED THEREFROM

This is a continuation-in-part application of the U.S. patent application Ser. No. 070,302 filed on July 6, 1987, and now abandoned.

BACKGROUND OF THE INVENTION

The present invention relates to a method for producing monocalcium phosphate and products created from same.

Monocalcium phosphate heretofore, was typically produced by mixing dicalcium silicate with phosphoric acid. This prior process typically suffered two disadvantages. During the prior process of mixing dicalcium silicate with phosphoric acid, a great deal of heat is generated. This is due to the exothermic nature of the process. The amount of heat generated during the prior process made the process difficult to carry out on a commercial basis.

Moreover, the prior process of mixing dicalcium silicate with phosphoric acid does not provide an efficient method for creating monocalcium phosphate. To this end, in the prior process, not all of the calcium in the dicalcium silicate is leached out during the process, instead some of the calcium separates out of the mixture and does not form monocalcium phosphate.

Accordingly, there is a need for an improved method for making monocalcium phosphate.

SUMMARY OF THE INVENTION

The present invention provides an improved method for making monocalcium phosphate. The method includes the steps of mixing phosphoric acid with water and then adding to that mixture what is defined in the specification as "brown mud". Brown mud comprises dicalcium silicate and: hematite; calcite; gehlenite; perovskite; anatase; sodalite; calcium aluminum sulfate; and sodium salts.

Preferably, the method of the present invention includes the step of mixing approximately 3% to about 50% by weight phosphoric acid with approximately 50% to about 97% by weight water. The phosphoric acid/water mixture is then mixed with brown mud in an approximately 1:1 to about 3:1 weight ratio of phosphoric acid/water to brown mud.

In an embodiment of the present invention, the method includes the steps of mixing phosphoric acid with water and slowly adding thereto brown mud. The resultant product is then fed to a heating apparatus and dried so that the resultant product has a moisture content of 10% or less by weight.

The resultant product of the present invention has many applications, as set forth in the detailed description of the presently preferred embodiments, including: industrial waste disposal; agricultural chemical; plant food; ammonia suppressants; calcium food additives; diaper batting; and as a pharmaceutical source of calcium.

In an embodiment of the present invention, the resultant product created will comprise approximately 3% to about 22% calcium phosphate with the remainder of the product including the other components in the original brown mud and mixture.

Additional features and advantages of the present invention are described in, and will be apparent from, the detailed description of the presently preferred embodiments.

DETAILED DESCRIPTION OF THE PRESENTLY PREFERRED EMBODIMENTS

The present invention provides an improved method for making monocalcium phosphate and an improved product produced therefrom. The improved method includes mixing a phosphoric acid and water mixture with what is known as "brown mud" or "brown lime". Brown mud is a residue substance derived as a result of the application of dehydrated lime in the foundary process of purifying bauxite for the purpose of producing aluminum. Due to the soil content in Selina County, Ark., the Bayer process (a method for producing alumina from bauxite by heating it in a sodium hydroxide solution) is utilized to purify bauxite found in the soil, for the purpose of producing aluminum. Because of the soil content in Selina County, Ark. and the use of the Bayer process, brown mud is produced as a residue during this process. As used herein, the term "brown mud" refers to this residue product which the inventor believes is only found in Selina County, Ark.

Brown mud has a pH above approximately 10.5 and its chemical composition is approximately as follows:

| Component Name | Component Formula | Component % |
| --- | --- | --- |
| Dicalcium silicate | $2CaO'SiO_2$ | 57 |
| Hematite | $Fe_2O_3$ | 6 |
| Calcite | $CaCO_3$ | 8 |
| Gehlenite | $2CaO'Al_2O_3'SiO_2$ | 22 |
| Perovskite | $CaO'TiO_2$ | 5 |
| Anatase | $TiO_2$ | 3 |
| Sodalite | $3Na_2O'3Al_2O_3'6SiO_2'Na_2SO$ | 25 |
| Calcium aluminum sulfate | $4CaO'3Al_2O_3'SO_3$ | 5 |
| Sodium salts | $Na_2CO_3$ and $NaAlO_2$ | trace |

The method of the present invention comprises mixing phosphoric acid with water and then adding thereto brown mud. In a preferred embodiment of the present invention, the method includes the step of heating the resultant phosphoric acid, water, and brown mud mixture in a drying apparatus to reduce its moisture content to 10% or less by weight. Preferably, approximately 3% to about 50% by weight of phosphoric acid is added to approximately 50% to about 97% by weight of water. To the phosphoric acid/water mixture, brown mud is added in a weight ratio of approximately 1:1 to about 1:3 brown mud to phosphoric acid/water.

The grade of phosphoric acid to be utilized in the method of the present invention is dependent upon, in part, the desired resultant product. To this end, in certain applications, especially those subject to Food and Drug Administration (FDA) approval, the grade of phosphoric acid utilized is critical. Accordingly, the grade of phosphoric acid to be utilized should be consistent with the desired application of the resultant product to be created.

Typically, phosphoric acid is sold in three grades: food grade; tech grade; and FS grade. In applications of the resultant product that are subject to FDA approval, and certain other applications of the resultant product, the food grade quality of phosphoric acid should be utilized. Usually, the FS grade is only utilized for fertilizer and like type applications of the resultant product.

The method of the present invention provides an improved process for producing monocalcium phosphate. To this end, the method of the present invention does not result in the generation of a great deal of heat as in the prior method of adding dicalcium silicate to phosphoric acid. Furthermore, the monocalcium phosphate yield is enhanced through the present method.

As stated above, the method of the present invention produces a monocalcium phosphate product. In a preferred embodiment of the method of the present invention, the resultant monocalcium phosphate product will initially have a monocalcium phosphate content of approximately 3 to about 22 weight percent. The remaining content of the resultant product will typically include the remaining products in the original brown mud mixture. In a preferred embodiment of the method of the present invention, the resultant product will have the approximate following composition, by weight: brown mud —70% to about 87%; phosphoric acid —3 to about 20%; and water —10%.

The resultant product of the present invention has many applications including, inter alia: industrial waste disposal; agricultural chemical; plant foods; ammonia suppressants to be utilized with poultry and other livestock; calcium feed additives; pharmaceutical applications; and treatment of and batting for infant diapers. For example, the resultant product can be used in industrial waste disposal in its anhydrous state as a cool down for a scrubber. In the agricultural chemical area, an example of the use of the monocalcium phosphate of the present invention is as a type of fertilizer. The monocalcium phosphate can also provide a source for plant food through the addition of ammonia to the product.

Due to the monocalcium phosphate's excellent properties as an ammonia suppressant, monocalcium phosphate is especially useful in suppressing the odors generated from uric acid. To this end, experiments have indicated that 100 lbs. of a monocalcium phosphate product made pursuant to the method of the present invention per 12,000 square feet of a chicken grow out area (a chicken feed area) applied approximately every 6 to 8 weeks will limit any ammonia build-up in the area to below approximately 20 parts per million. Furthermore, initial indications indicate that the monocalcium phosphate produced by the method of the present invention has no adverse effect on poultry when phosphoric acid of food grade quality is utilized. By way of example and not limitation, examples of the present invention will now be set forth:

EXAMPLE 1

A slurry mixer, having a stainless steel construction, was filled with approximately 11 lbs. of phosphoric acid and approximately 11 lbs. of water. Because the desired resultant product was to be an ammonia hold for use in suppressing the ammonia generated by poultry and other livestock, food grade phosphoric acid was utilized.

To the resultant phosphoric acid and water mixture, brown mud was slowly added while the mixing means of the slurry tank mixer was engaged. A foaming action initially occurred with a corresponding slight rise in the temperature of the phosphoric acid and water mixture. However, the foaming action subsided as the mixing continued. The addition of brown mud continued until approximately 11 lbs. of brown mud was added to the phosphoric acid and water mixture. The mixing action was continued for approximately 8 to about 10 minutes.

The resultant slurry mixture was then discharged from an auger at the bottom of the slurry tank. The slurry was fed from the auger onto a heat resistant belt that fed the slurry into a drying kiln. The drying kiln utilized was a Louisville-type gas fired kiln. However, any type of drying apparatus can be utilized such as, for example, a high temperature kiln, blower type, or steam supplied pelleting machine. The slurry was dried at a temperature of approximately 500° to about 700° F. for approximately 3 to about 12 minutes, so that the resultant product had a moisture content equal to or less than 10%.

The resultant product produced pursuant to the method of this example has specific applications as an ammonia hold. Indeed, because food grade phosphoric acid was utilized, the resultant product of this example can be utilized as an ammonia hold for poultry, livestock, and even as a batting for diapers.

EXAMPLE 2

In this example, the same procedure was followed as set forth above for Example 1, except the grade of phosphoric acid was not food quality, but rather was tech quality. The resultant product produced pursuant to this example has applications as an odors suppressant for stockyards, zoos, and the like, or for suppressing odors generated by garbage.

EXAMPLE 3

In this example, the same procedure as set forth above for Example 1 was utilized except that the grade of phosphoric acid utilized was FS grade. The resultant product produced pursuant to the method of this example has applications as a fertilizer.

EXAMPLE 4

In this example, food grade phosphoric acid having a purity of 87% was mixed in a stainless steel slurry tank with water to obtain a solution of 42% phosphoric acid by weight. The resultant mixture had a volume of approximately 2.3 gallons. Although the mixing vessel was a stainless steel slurry tank, any type of holding tank and pump or mixer that meets requisite food grade requirements can be utilized.

Approximately 11 lbs. of brown mud was slowly added to the mixture. The brown mud mixture was then mixed for approximately 8 to 10 minutes. Sufficient brown mud was added to create an end product that comprised approximately 17% monocalcium phosphate. If desired, binders to create a desired powder, pellet, or granular form can be added to this mixture.

The slurry was discharged onto an auger or belt for movement into a drying apparatus. In this example, the drying apparatus was a tumbler-type dryer. The slurry was dried at approximately 700° F. for approximately 10 minutes to obtain a resultant product that had a moisture content equal to or less than 10% by weight. After the product cooled down, the material was moved out of the drying apparatus, via, for example, a conveyor belt and packaged.

The resultant material of this example has specific applications as an ammonia hold. Specifically, an ammonia hold for utilization with poultry and other livestock.

EXAMPLE 5

In this example, the same procedure as set forth previously for Example 4 was followed except that sufficient water was added to the phosphoric acid to make a final solution that was only 12% phosphoric acid. Example 4 was further modified in that approximately 5.5 lbs. of brown mud was added to create an end product having only 6% monocalcium phosphate by weight. The resultant product has specific applications as a liquid form of an ammonia hold.

EXAMPLE 6

In this example, tech grade phosphoric acid 75% was mixed with water to create a resultant solution comprising 40% phosphoric acid. The total volume of the mixture was approximately 2.3 gallons. To the slurry tank having this mixture, brown mud was added in the amount of approximately 11 lbs. This will create a resultant product having approximately 20% by weight monocalcium phosphate.

The slurry tank was emptied through a discharge auger and then dried in the drying apparatus at a temperature of approximately 700° F. for approximately 12 minutes to achieve a resultant product having a moisture content of 10% or less by weight. The resultant product of this example has specific applications for use as an ammonia hold in stockyards, dog pounds, rodeo arenas, horse stalls, and the like. These areas of application do not require FDA approval and therefore, do not require food quality phosphoric acid.

EXAMPLE 7

In this example, fertilizer grade phosphoric acid 75% was mixed with water to achieve a 40% solution of phosphoric acid by weight. The resultant product had a volume of approximately 2.3 gallons. To the slurry tank having this mixture brown mud in an amount of approximately 11 lbs. was slowly added to achieve a resultant product having 20% monocalcium phosphate by weight. The same mixing and drying procedure was followed as in Example 6. 1

The resultant product of this example has specific applications for being further processed to create a plant food. To this end, by way of example, to the resultant product, before it is dried, ammonia can be slowly added, either in liquid or gas form, during the mixing in the slurry tank. The end product will be a monoammonium phosphate having applications as a plant food or fertilizer. Of course, the resultant product of this example can be further processed or treated differently to create a different desired end product.

It should be understood that various changes and modifications to the presently preferred embodiments described herein will be apparent to those skilled in the art. Such changes and modifications can be made without departing from the spirit and scope of the present invention and without diminishing its attendant advantages.

I claim:

1. A method for producing monocalcium phosphate comprising the steps of:
   mixing phosphoric acid with water; and
   adding to a resultant phosphoric acid/water mixture brown mud.

2. The method of claim 1 wherein:
   the phosphoric acid comprises approximately 3% to about 50% by weight of the phosphoric acid/water mixture; and
   the water comprises approximately 50% to about 97% by weight of the phosphoric acid/water mixture.

3. The method of claim 2 wherein the brown mud is added to the phosphoric acid/water mixture in a weight ratio of approximately 1:1 to about 1:3 brown mud to phosphoric acid/water.

4. The method of claim 1 wherein the phosphoric acid is a food grade phosphoric acid.

5. The method of claim 1 wherein the phosphoric acid is a tech grade phosphoric acid.

6. The method of claim 1 wherein the phosphoric acid is a FS grade phosphoric acid.

7. The method of claim 1 including the step of heating a resultant phosphoric acid/water/brown mud mixture to achieve a final product having a moisture content equal to or less than 10% by weight.

8. The method of claim 1 including the step of adding sufficient brown mud to achieve a final product having approximately 3% to 22% by weight monocalcium phosphate.

9. The product of the process of claim 4.

10. The product of the process of claim 5.

11. The product of the process of claim 6.

12. A method for producing monocalcium phosphate comprising the steps of:
   mixing approximately 3% to about 50% by weight phosphoric acid with approximately 50% to about 97% by weight water;
   adding to a resultant phosphoric acid/water mixture brown mud, the ratio of phosphoric acid/water to brown mud being approximately 1:1 to about 3:1 by weight; and
   heating the resultant phosphoric acid/water/brown mud mixture.

13. The method of claim 12 wherein the resultant phosphoric acid/water/brown mud is heated so that a final resultant product is created having a moisture content equal to or less than 10% by weight.

14. The method of claim 12 wherein the phosphoric acid/water/brown mud mixture is heated in a drying apparatus at a temperature of approximately 500° to about 700° F. for approximately 3 minutes to about 12 minutes.

15. The method of claim 12 including the steps of:
   choosing a food grade phosphoric acid; and
   mixing the phosphoric acid, water, and brown mud in a food quality mixing apparatus.

16. e method of claim 12 including the step of adding ammonia to the phosphoric acid/water/brown mud mixture.

17. A monocalcium phosphate product for use as an ammonia hold comprising:
   phosphoric acid;
   water; and
   brown mud.

18. The product of claim 17 wherein:
   the phosphoric acid and water are mixed together so that the phosphoric acid comprises 3% of a phosphoric acid/water mixture by weight, and the water comprises 50% to about 97% of the phosphoric acid/water mixture by weight; and
   the brown mud is added to the phosphoric acid/water mixture in a weight ratio of approximately 1:1 to about 1:3 brown mud to phosphoric acid/water.

19. The product of claim 17 wherein the phosphoric acid is food grade quality phosphoric acid.

20. The product of claim 17 wherein the product includes approximately 3% to about 22% by weight monocalcium phosphate.

* * * * *